United States Patent
Lota

(10) Patent No.: US 7,806,451 B2
(45) Date of Patent: Oct. 5, 2010

(54) PIGGYBACK SLIDER TRAY DESIGN

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 438 days.

(21) Appl. No.: 11/970,727

(22) Filed: Jan. 8, 2008

(65) Prior Publication Data
US 2009/0174207 A1 Jul. 9, 2009

(51) Int. Cl.
B60R 7/04 (2006.01)

(52) U.S. Cl. .................. 296/24.34; 296/37.8; 296/37.14

(58) Field of Classification Search .............. 296/24.34, 296/37.8, 37.14; 224/275, 400, 539
See application file for complete search history.

(56) References Cited

U.S. PATENT DOCUMENTS

| | | | |
|---|---|---|---|
| 5,106,153 | A | 4/1992 | Durling |
| 5,660,310 | A | 8/1997 | LeGrow |
| 6,367,857 | B2 | 4/2002 | Kifer et al. |
| 6,726,267 | B2 * | 4/2004 | Kim et al. ................ 296/24.34 |
| 6,883,692 | B2 | 4/2005 | Harden et al. |
| 7,011,273 | B1 | 3/2006 | Stanford |
| 7,029,048 | B1 * | 4/2006 | Hicks et al. .............. 296/24.34 |
| 7,237,816 | B1 | 7/2007 | Singh et al. |
| 7,341,297 | B2 * | 3/2008 | Nakamura et al. ....... 296/24.34 |
| 7,407,210 | B2 * | 8/2008 | Arbaugh et al. .......... 296/24.34 |
| 7,431,365 | B2 * | 10/2008 | Sturt et al. ............... 296/24.34 |
| 7,581,774 | B2 * | 9/2009 | Abro et al. ................. 296/37.8 |
| 2003/0221988 | A1 | 12/2003 | Achatz et al. |
| 2007/0119885 | A1 | 5/2007 | Miller et al. |
| 2007/0182183 | A1 * | 8/2007 | Lota ........................ 296/24.34 |
| 2008/0048466 | A1 * | 2/2008 | Singh et al. ................ 296/37.8 |
| 2009/0115215 | A1 * | 5/2009 | Abro et al. ............... 296/24.34 |
| 2009/0174207 | A1 * | 7/2009 | Lota ........................ 296/24.34 |
| 2009/0174208 | A1 * | 7/2009 | Lota ........................ 296/24.34 |
| 2010/0078954 | A1 * | 4/2010 | Liu et al. ................. 296/24.34 |
| 2010/0090486 | A1 * | 4/2010 | Carnevali ................ 296/24.34 |
| 2010/0090487 | A1 * | 4/2010 | Carnevali ................ 296/24.34 |

FOREIGN PATENT DOCUMENTS

JP 2000135950 5/2000

* cited by examiner

Primary Examiner—Glenn Dayoan
Assistant Examiner—Gregory Blankenship
(74) Attorney, Agent, or Firm—Gifford, Krass, Sprinkle, Anderson & Citkowski, P.C.

(57) ABSTRACT

A vehicle center console assembly having a bin secured to a floor of the vehicle and revealing an interior bounded in part by first and second extending sides. A pair of support rails extend along inner surfaces of the extending sides in communication with its interior. A first tray is supported upon the rails and adapted to be slidably displaced between forward and rearward locations associated with the bin. A second tray includes side projecting lip edges overlaying the support rails and is adapted to being releasably secured to an exposed edge location of the first tray, such that the second tray is capable of being displaced with the first tray in substantially non-contacting fashion with top surfaces of the support rails.

19 Claims, 5 Drawing Sheets

US 7,806,451 B2

PIGGYBACK SLIDER TRAY DESIGN

FIELD OF THE INVENTION

The present invention relates generally to insertable trays for use with such as a vehicle center console assembly. More specifically the present invention discloses a main insertable (cup holder) tray, an auxiliary tray being releasably secured to the main tray in a further recessed fashion and while permitting auxiliary tray to linearly displace along with the main tray in a substantially free floating manner along interior extending rail supports established within the interior sides of the bin

BACKGROUND OF THE INVENTION

The prior art is documented with vehicle console assemblies incorporating either fixed or removable trays, and such as which are disposed relative to an interior defining bin associated with the console. Examples of prior art assemblies include those in which, in addition to a primary storage tray or enclosure, a secondary attachment is separately secured to a wall of the bin. Additional assemblies include those in which the console may include an interior compartment in which a removable storage bin can be housed. Other references teach a stand-alone and slidable inner tray mounted upon a pair of rails.

SUMMARY OF THE INVENTION

The present invention discloses a vehicle center console assembly, within which are selectively installed first and second trays. A bin is secured to a floor of the vehicle and reveals an interior bounded in part by first and second extending sides. A pair of support rails extend along inner surfaces of the extending sides, proximate the top of the bin and in communication with its interior.

A first tray is supported upon the rails and includes underside and side extending configured edges adapted to be slidably displaced between forward and rearward locations associated with the bin. A second tray includes side projecting lip edges overlaying the support rails and is adapted to being releasably secured to an exposed edge location of the first tray, such that the second tray is capable of being displaced with the first tray in substantially non-contacting fashion with top surfaces of the support rails. An armrest is secured in at least one of pivotally and slidably extending fashion to the bin and, in combination with the first and second trays, encloses a top of the bin.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
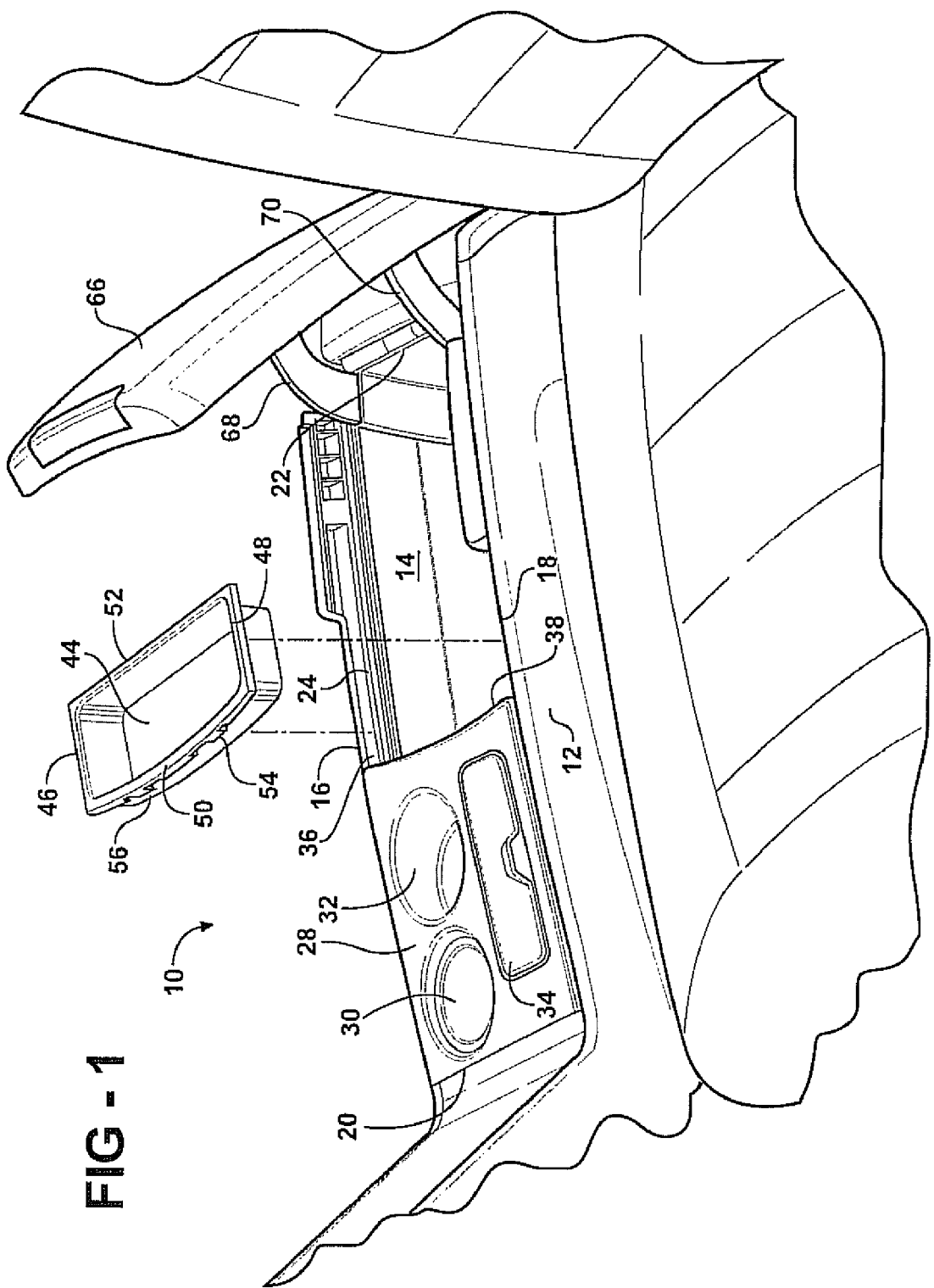
FIG. 1 is a partially exploded perspective view of the center console with main cup holder and storage tray installed upon the inner side disposed rail supports and further illustrating the downwardly configured engaging tangs associated with a forward lip edge of the auxiliary engaging tray.
Figure 2:
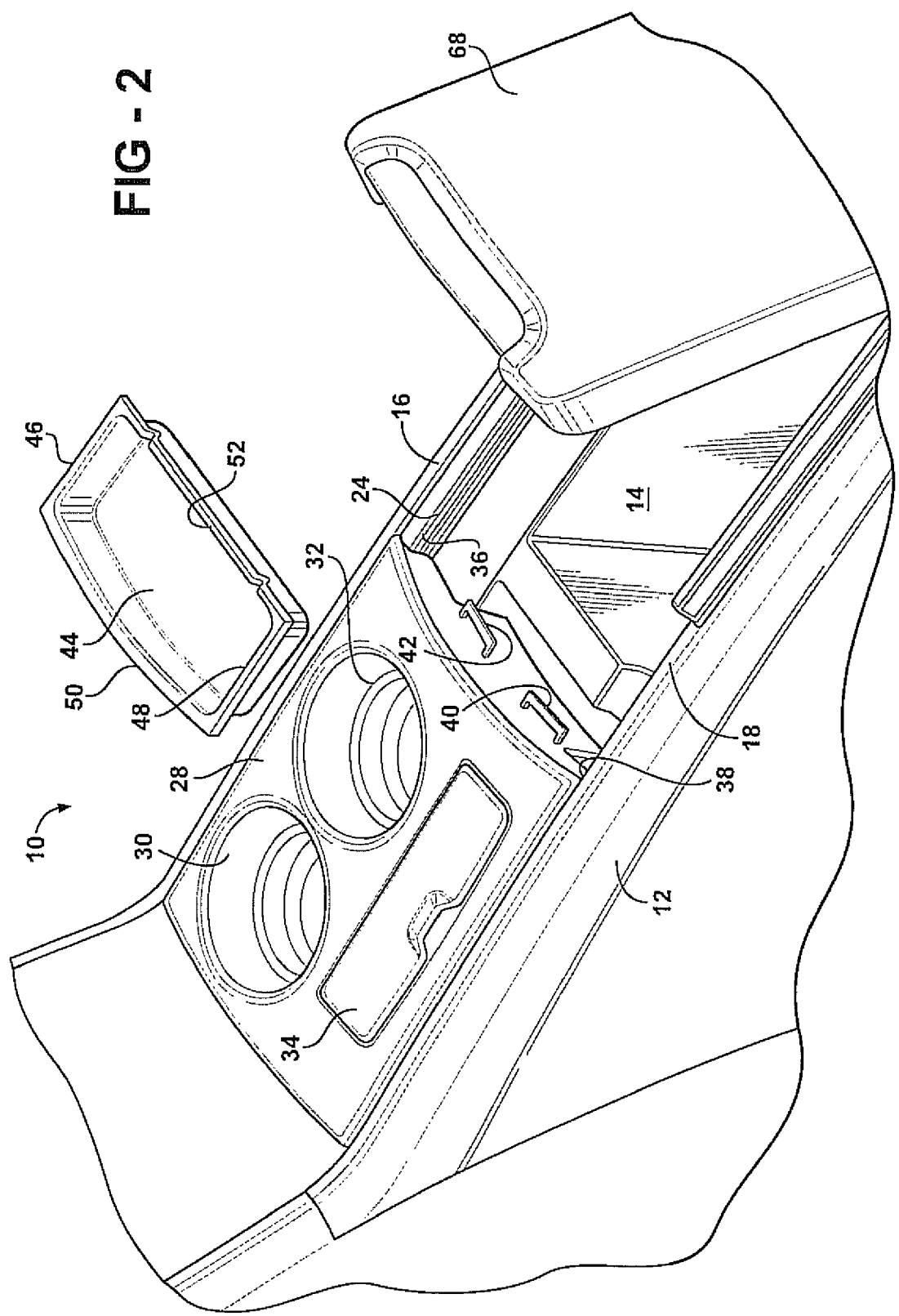
FIG. 2 is a rotated perspective of FIG. 1 and further showing the associated engagement channels defined within forward projecting brackets associated with the main tray and for matingly receiving the forwardly directed tangs of the auxiliary tray in an installed position.
Figure 3:
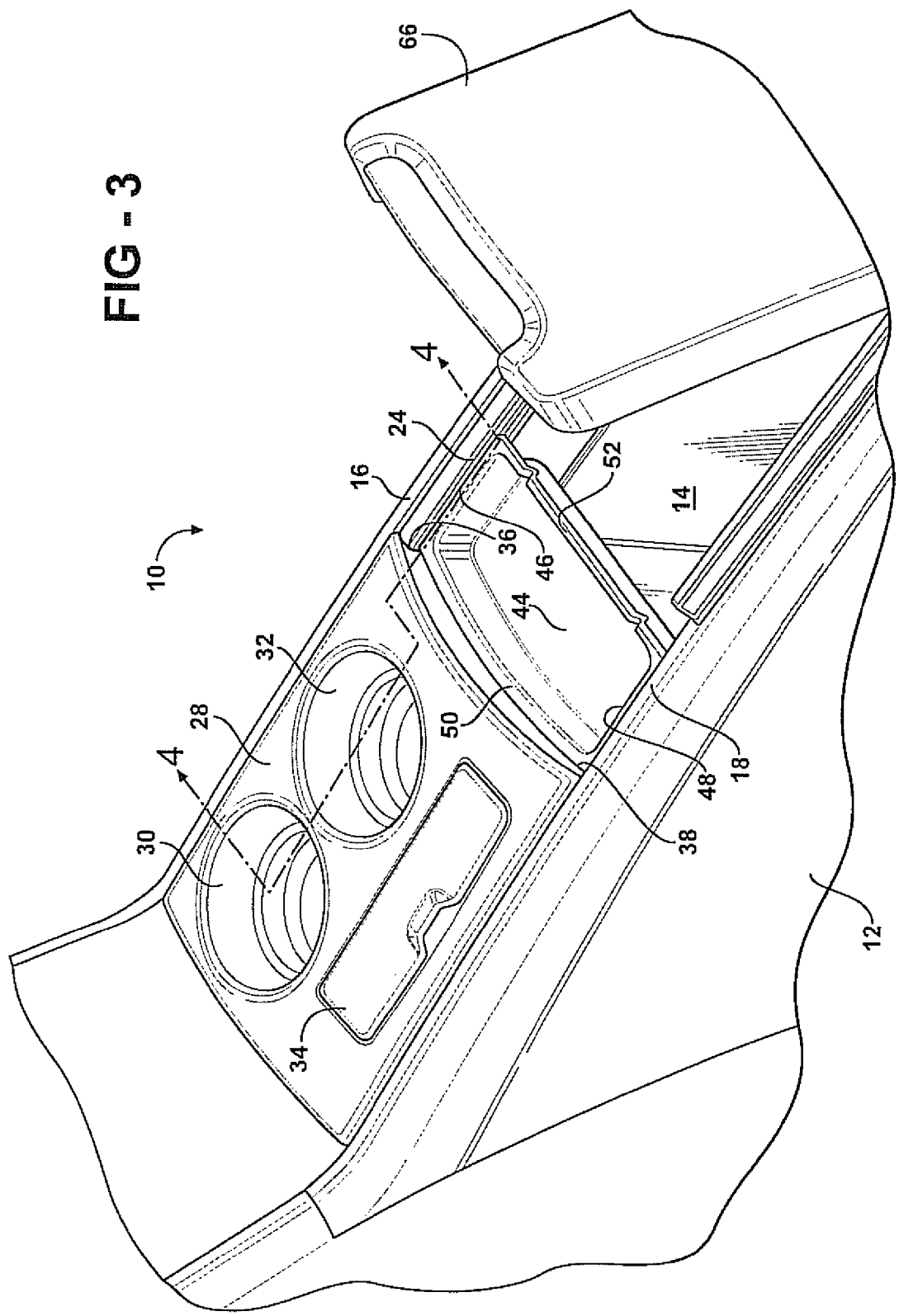
FIG. 3 is an illustration similar to FIG. 2 of the auxiliary tray in an installed configuration relative to the main tray.

Referring now to FIGS. 1-3, a series of perspective views are illustrated of a center console assembly, generally shown at 10, according to a selected embodiment of the present inventions. The console assembly includes a bin 12 secured to a floor of the vehicle and revealing a generally open interior 14.

The bin 12 also includes first 16 and second 18 extending sides, these extending between first 20 and second 22 ends (FIG. 1) and generally defining therebetween an enclosed volume corresponding to the open interior 14. A pair of support rails are provided along extending and inner opposing surfaces of the extending sides 16 and 18 in communication with the bin interior. A first selected one of the rails is shown at 24 in each of FIGS. 1-3, this corresponding to side 16, a second identically configured and opposing rail being configured along the other side 18 and being hidden from view. The support rails each further exhibit an inner-most projecting ledge, see at 26 in FIG. 5, the purpose for which will now be described.

A first tray is provided at 28 exhibits a specified shape and size with a generally rectangular and three dimensional configuration including first and second sides and opposite extending ends. The first tray is typically constructed of a plasticized and molded material configured to include at least one cup holder, see at 30 and 32, as well as a portable item storage compartment 34.

Underside configured edges are shown at 36 and 38, and which are associated with the lengthwise sides of the first tray 28 and further such that a substantially flush upper profile mates with the extending sides of the bin 12. In use, the first tray 28 is supported upon the inwardly disposed rails (again at 24), such that it is slidably displaced between forward and rearward locations associated with the bin 12. The first tray further includes engagement channels defined within brackets 40 and 42 (see FIG. 2) projecting from an interior accessible edge of the first tray 28.

Figure 5:
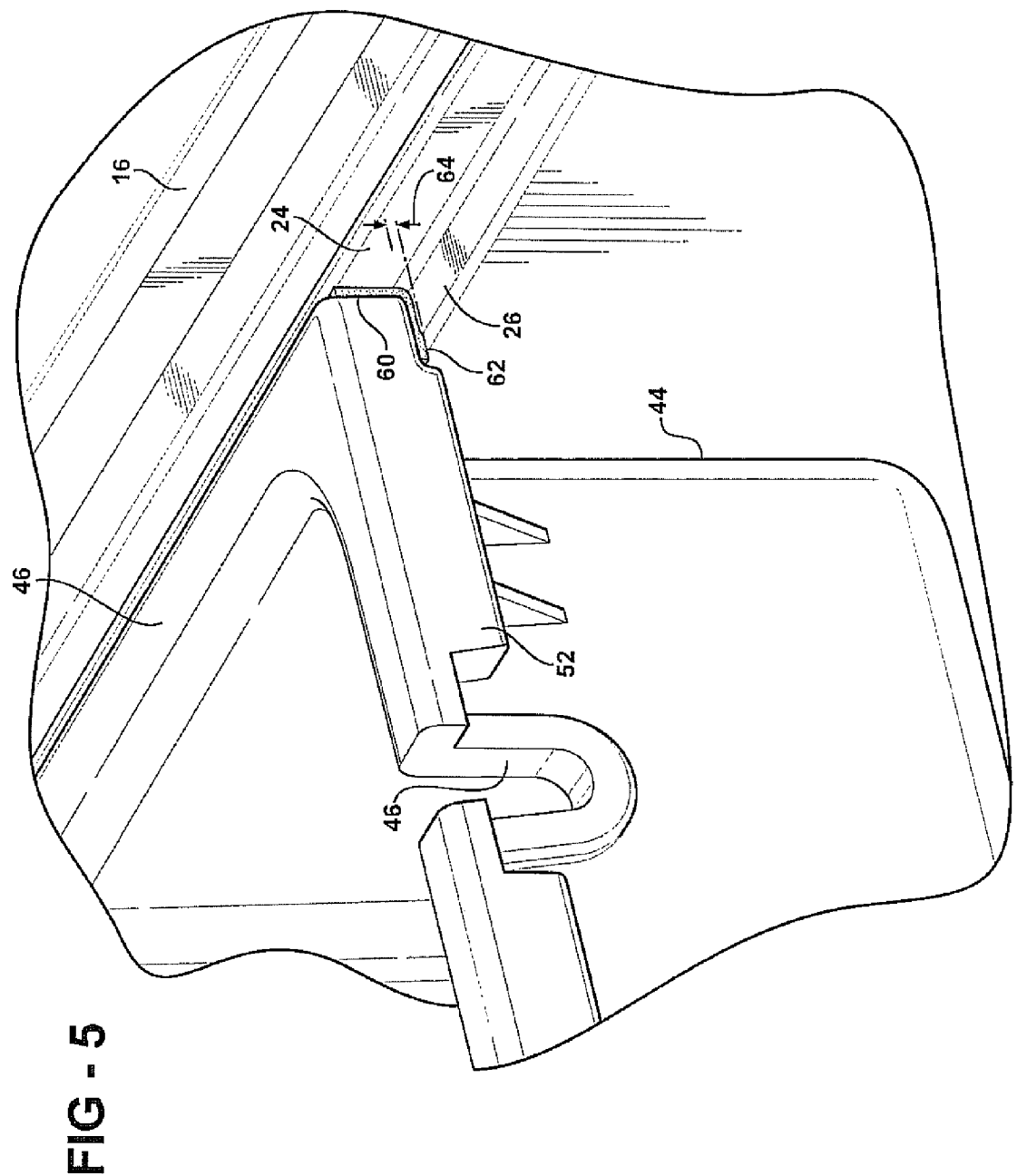
FIG. 5 is an enlarged partial view of a forward portion of the auxiliary tray and showing such as a notched configuration for receiving such as cell phone or pda power cord, as well as the provision of underside and side edge extending layers of felt for assisting in maintaining smooth and substantially frictionless contact between the auxiliary tray and the inner extending rail supports.

A second tray is illustrated at 44 and, similar to the first tray 28, is also constructed of a plasticized and molded material configured to include an open interior bin and exhibiting a notched edge location, see at 46 in FIG. 5 such as for receiving a power cord (not shown). The second tray 44 further includes perimeter defined and side projecting lip edges 46 and 48, as well as first and second interconnecting and widthwise ends 50 and 52.

As best shown in FIG. 1, the second tray 44 includes downwardly configured engaging tangs, at 54 and 56, associated with interior accessible and cross wise extending lip edge 50 arrayed in aligning and overhead/opposing fashion relative to the engaging brackets 40 and 42 of the first tray 28. The tangs 54 and 56 are downwardly engaged to the brackets 40 and 42 to secure the second tray 44 to the first tray 28 in the installed configuration of FIG. 3.

Figure 4:
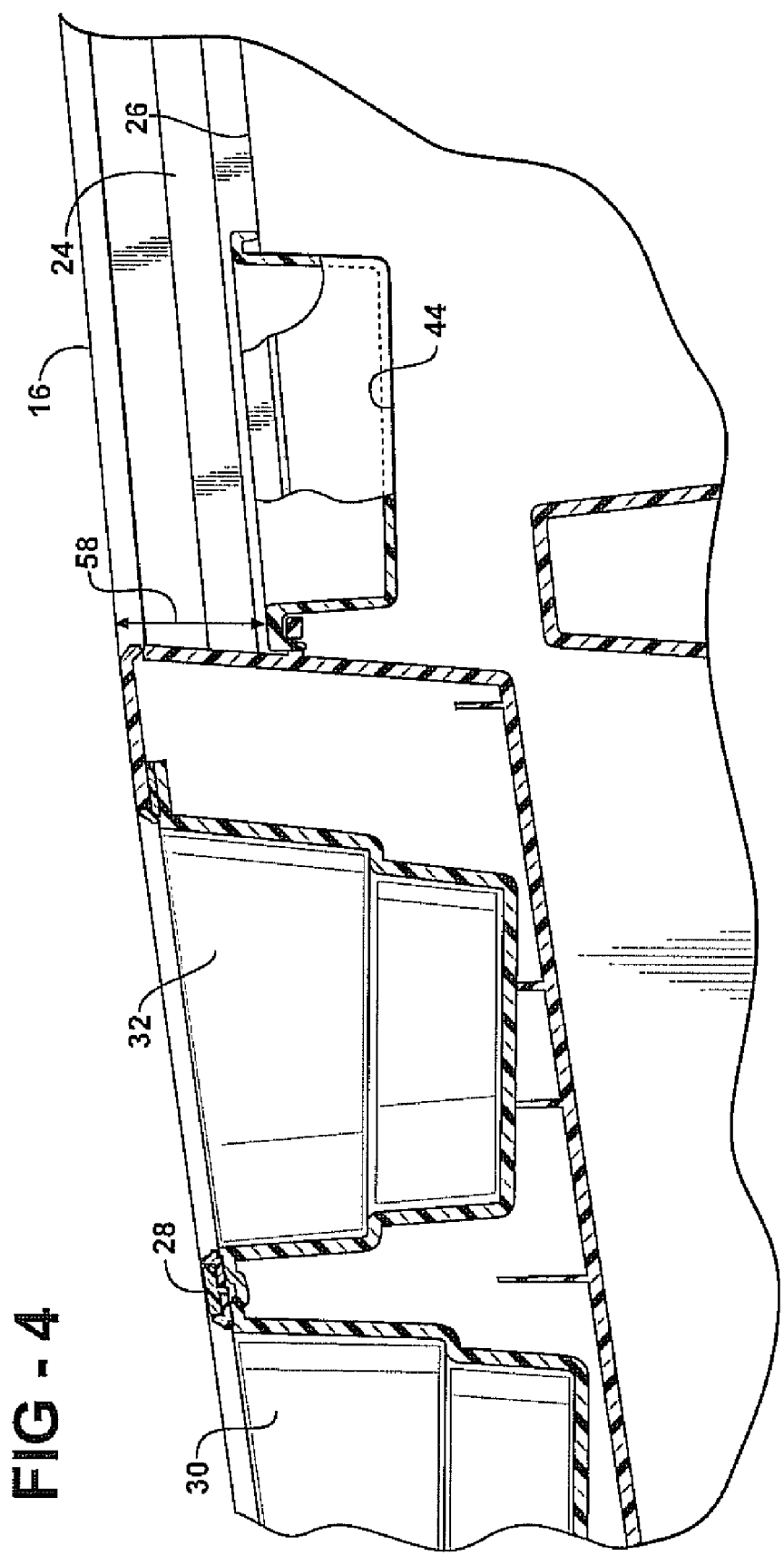
FIG. 4 is a lengthwise cutaway view taken along line 4-4 of FIG. 3 and showing the supported and substantially non-contacting arrangement established between the rail supports and the forward disposed auxiliary tray.

In this fashion, the second tray 44 is adapted to being releasably secured to the exposed edge of the first tray 28 upon which are configured the brackets 40 and 42, such that the second tray 44 is capable of being displaced with the first tray in substantially non-contacting fashion with the support rails, and in particular relative to the inwardly projecting ledge step shown at 26. As further best shown in the side cutaway of FIG. 4, the perimeter extending lip edge associated with the secured second tray 44 (e.g. interconnected sides 46, 48, 50 and 52) are disposed a recessed distance 58 below the upper profile of the main tray.

In a preferred application, a layer of felt, see in FIG. 5 with angled sides 60 and 62 is secured to at least one of outer and underside facing locations of each of the side projecting lip edges 46 and 48 associated with the second tray 44. The side projecting lip edges 46 and 48 are dimensioned a predetermined floating distance, see at 64 in FIG. 5, such as at least 1 mm, above the rail ledges (again at 26 in FIG. 5) in a normal and non-deformed condition. In application, and upon any amount of force being exerted against the secondary/auxiliary tray, the associated lip edges 46 and 48 will deflect downwardly the nominal distance Finally, and again referencing each of FIGS. 1-3, an armrest 66 secured in at least one of pivotally (see bracket supports 68 and 70 in FIG. 1) and slidably extending fashion to the bin 12. The armrest, 66 in combination with the installation of the first 28 and second 44 trays, enclose the open top of the bin 12.

Having described my inventions other and additional preferred embodiments will become apparent to those skilled in the art to which it pertains, and without deviating from the scope of the appended claims.

I claim:

1. A vehicle center console assembly, comprising;
   a bin secured to a floor of a vehicle and revealing an interior, said bin including first and second extending sides, a pair of support rails extending along inner surfaces of said extending sides in communication with said interior;
   a first tray having a specified shape and size and supported upon said rails, said first tray adapted to be slidably displaced between forward and rearward locations associated with said bin; and
   a second tray including side projecting lip edges overlaying said rail supports, said second tray adapted to being releasably secured to an exposed edge of said first tray such that said second tray is capable of being displaced with said first tray in substantially non-contacting fashion with said support rails.

2. The invention as described in claim 1, said first tray further comprising engagement channels defined within brackets projecting from an interior accessible edge of said first tray.

3. The invention as described in claim 2, said second tray further comprising downwardly configured engaging tangs associated with a further interior accessible and cross wise extending lip edge and which is arrayed in opposing fashion relative to said first tray, said tangs engaging said brackets to secure said second tray to said first tray.

4. The invention as described in claim 1, further comprising a layer of felt secured to an underside of each of said first and second side projecting lip edges associated with said second tray.

5. The invention as described in claim 1, said first tray further comprising a plasticized and molded material configured to include at least one cup holder and a portable item storage compartment.

6. The invention as described in claim 1, said second tray further comprising a plasticized and molded material configured to include an open interior bin and exhibiting a notched edge for receiving a power cord.

7. The invention as described in claim 1, said first tray further comprising a substantially flush upper profile mating with said extending sides of said bin.

8. The invention as described in claim 7, a perimeter extending lip edge associated with said secured second tray being disposed a recessed distance below said upper profile of said main tray.

9. The invention as described in claim 1, further comprising an armrest secured in at least one of pivotally and slidably extending fashion to said bin and, in combination with said first and second trays, enclosing a top of said bin.

10. The invention as described in claim 1, each of said support rails further comprising an inwardly projecting ledge upon which seated underside configured edges associated with said sides of said first tray, said side projecting lip edges associated with said secured second tray floating a distance of at least 1 mm above said rail ledges in a normal and non-deformed condition.

11. A vehicle center console assembly, comprising;
    a bin secured to a floor of a vehicle and revealing all interior, said bin including first and second extending sides, a pair of support rails extending along inner surfaces of said extending sides in communication with said interior;
    a first tray having a specified shape and size and supported upon said rails, said first tray adapted to be slidably displaced between forward and rearward locations associated with said bin, said first tray further comprising engagement channels defined within brackets projecting from an interior accessible edge of said first tray; and
    a second tray including side projecting lip edges overlaying said rail supports, said second tray further comprising downwardly configured engaging tangs associated with a further interior accessible and cross wise extending lip edge and which is arrayed in opposing fashion relative to said first tray, said tangs engaging said brackets to secure said second tray to said first tray such that said second tray is capable of being displaced with said first tray in substantially non-contacting fashion with said support rails.

12. The invention as described in claim 11, further comprising a layer of felt secured to an underside of each of said first and second side projecting lip edges associated with said second tray.

13. The invention as described in claim 11, said first tray further comprising a plasticized and molded material configured to include at least one cup holder and a portable item storage compartment.

14. The invention as described in claim 11, said second tray further comprising a plasticized and molded material configured to include an open interior bin and exhibiting a notched edge for receiving a power cord.

15. The invention as described in claim 11, said first tray further comprising a substantially flush upper profile mating with said extending sides of said bin.

16. The invention as described in claim 15, a perimeter extending lip edge associated with said secured second tray being disposed a recessed distance below said upper profile of said main tray.

17. The invention as described in claim 11, further comprising an armrest secured in at least one of pivotally and slidably extending fashion to said bin and, in combination with said first and second trays, enclosing a top of said bin.

18. The invention as described in claim 11, each of said support rails further comprising an inwardly projecting ledge upon which seated underside configured edges associated with said sides of said first tray, said side projecting lip edges associated with said secured second tray floating a distance of at least 1 mm above said rail ledges in a normal and non-deformed condition.

19. A vehicle center console assembly, comprising:

a bin secured to a floor of a vehicle and including a pair of inwardly protecting ledges extending along inner surfaces of said bin in communication with said interior;

a first tray having a specified shape and size and exhibiting underside configured and side extending edges supported upon said ledges, said first tray adapted to be slidably displaced between forward and rearward locations associated with said bin;

a second tray including side projecting lip edges overlaying said rail supports, said second tray adapted to being releasably secured to an exposed edge of said first tray such that said second tray is capable of being displaced with said first tray in substantially non-contacting fashion with said ledges; and an armrest secured in at least one of pivotally and slidably extending fashion to said bin and, in combination with said first and second trays, enclosing a top of said bin.

* * * * *

UNITED STATES PATENT AND TRADEMARK OFFICE
CERTIFICATE OF CORRECTION

| | | |
|---|---|---|
| PATENT NO. | : 7,806,451 B2 | |
| APPLICATION NO. | : 11/970727 | |
| DATED | : October 5, 2010 | |
| INVENTOR(S) | : Charan Singh Lota | |

It is certified that error appears in the above-identified patent and that said Letters Patent is hereby corrected as shown below:

Column 4, line 28 replace "all" with --an--

Column 5, line 14 replace "protecting" with --projecting--

Signed and Sealed this
Seventeenth Day of May, 2011

David J. Kappos
*Director of the United States Patent and Trademark Office*